Sept. 15, 1953  R. D. MARX  2,652,070
GASOLINE TANK TRUCK VALVE
Filed Dec. 2, 1947
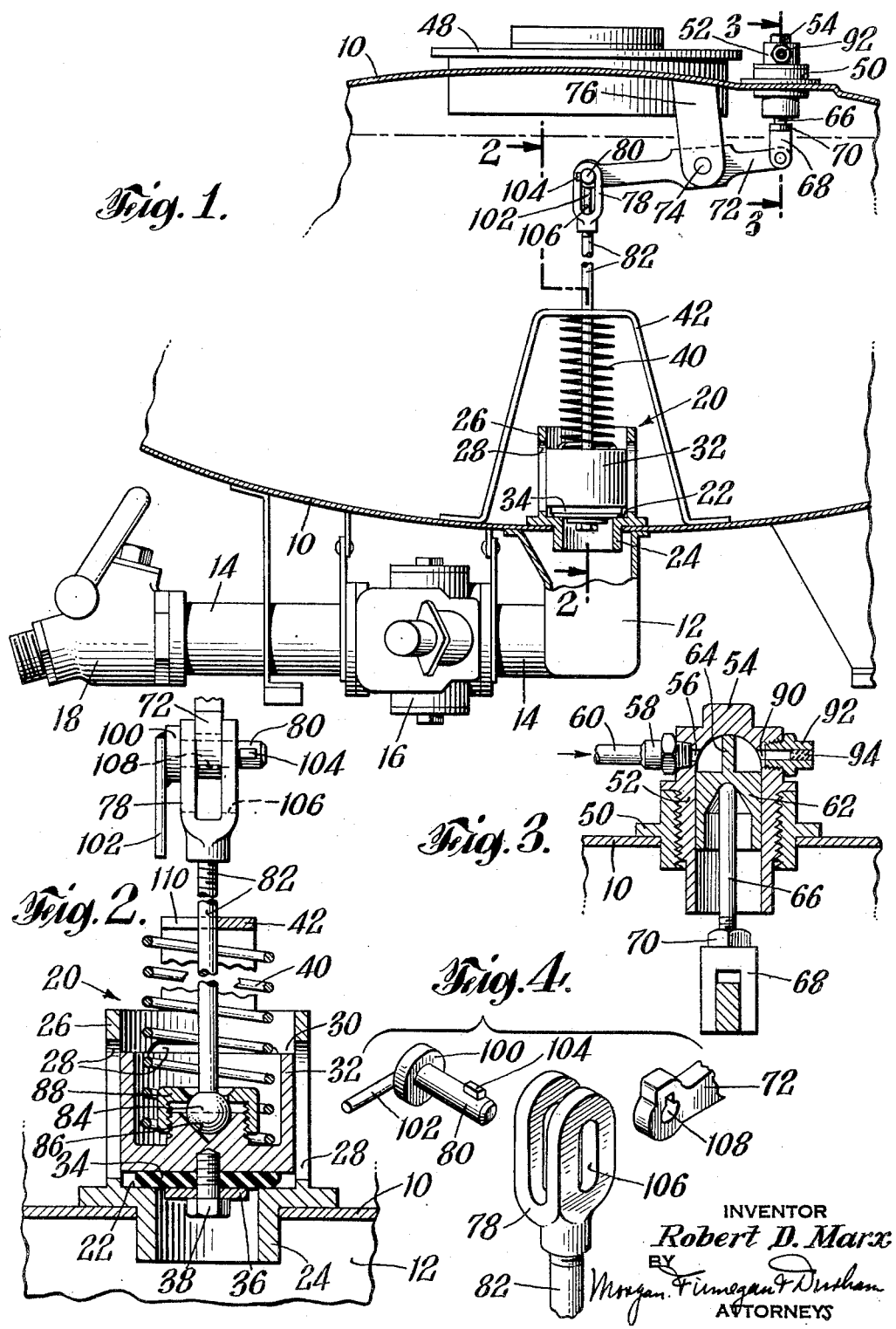
INVENTOR
*Robert D. Marx*
BY
*Morgan, Finnegan & Durham*
ATTORNEYS Patented Sept. 15, 1953

2,652,070

UNITED STATES PATENT OFFICE 2,652,070

GASOLINE TANK TRUCK VALVE

Robert D. Marx, Valley Stream, N. Y.

Application December 2, 1947, Serial No. 789,189

3 Claims. (Cl. 137—326)

The present invention relates to new and useful improvements in discharge valves particularly remote control discharge valves for gasoline tank trucks.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions and improvements herein shown and described.

The accompanying drawings, referred to herein and constituting a part hereof illustrate one embodiment of the invention, and together with the description, serve to explain the principles of the invention.

Of the drawings:

Figure 1 is a fragmentary vertical cross-section showing a typical illustrative embodiment of the present invention;

Figure 2 is a fragmentary detail section view taken on the line 2—2 of Figure 1;

Figure 3 is a fragmentary detail sectional view taken on the line 3—3 of Figure 1; and Figure 4 is an exploded perspective showing one of the connections in the linkage shown in Figures 1 and 2.

The present invention has for its object the provision of a novel and improved discharge valve and control means therefor adapted for the rapid discharge of gasoline from a compartment of a gasoline tank truck. A further object of the invention is the provision of an improved gasoline tank discharge valve which can be easily removed and reassembled when desired. A further object is the provision of an improved discharge valve for gasoline tanks which is automatically closed in the event of fire.

Referring now in detail to the accompanying drawings which show the present preferred and illustrative form of the invention as applied to a gasoline tank truck compartment of substantially conventional construction. As embodied, the invention is shown in connection with a tank 10 which may be one of several compartments forming the entire tank, these tanks usually being divided into several such compartments spaced longitudinally of the tank. The tank is shown as being generally elliptical in section and provided with an opening at its bottommost portion which opens into an elbow 12 connecting the tank with horizontal discharge pipe 14 which is controlled by valve 16 and terminates in a valved nozzle 18 usually located at the rear of the tank truck, the pipe being shown displaced 90° from its normal position for convenience of illustration. The aperture at the bottom of the tank is controlled by the valve assembly of the present invention, the valve portion being designated generally by the reference character 20 and comprises an annular valve seat 22 having a downwardly extending flange 24 which is fitted to the bottom of the tank to form a liquid-tight seal.

Surrounding the valve seat 22 and extending upwardly therefrom is a cylinder 26 provided with large openings 28 so that only narrow, vertically extending guide portions 30 remain to form the cylinder wall and to guide the piston-like valve member 32 in its travel up and down with respect to the valve seat 22. At its lower end the piston-like valve member 32 is provided with an oil resistant valve disc 34 secured to the piston by flange 36 and cap screw 38. The valve disc 34 is preferably formed of resilient synthetic rubber, and the piston-like valve member 32 is interiorly hollow. When the valve member 32 is lifted so as to raise the valve disc 34 from the seat 22, gasoline may flow from the tank 10 through the apertures 28 and into the elbow 12 and pipe 14, its flow therefrom being controlled by the service valves 16 and 18.

The valve member 32 is normally maintained in its closed position by means of a fairly stiff helical compression spring 40 which is seated within the valve member 32, and extends upwardly therefrom into engagement with the yoke 42 so that the valve is held securely closed unless it is positively moved upwardly against the compression of spring 40.

Means are provided for raising the valve member 32 when desired, and these means are preferably positioned within the interior of the tank and adapted to be operated by remote control. As embodied, an internally threaded flange 50 is secured in a suitable aperture on the top of the tank near the fill cover 48, the flange 50 being made gas- and liquid-tight with respect to the tank. Removably threaded into the flange 50 is a hydraulic cylinder 52 having its upper end closed and formed with a square boss 54 to which a wrench may be applied for installation or removal of the cylinder. The upper end of the cylinder communicates with port 56 into which is threaded a hydraulic fitting 58 connecting the upper portion of the cylinder with hydraulic line 60 by which hydraulic fluid is supplied to the cylinder under the control of a manually operated valve (not shown) which may be located in the truck.

Within the internal bore of cylinder 52 is mounted a piston 62 provided with a central, upwardly extending portion 64 which limits upward travel of the piston, while the underside of the piston is internally recessed to provide a seat for connecting pin 66 threaded into clevis 68 and secured in its desired adjusted link by means of lock nut 70, the connecting pin thus forming an adjustable link between the hydraulic piston 62 and the clevis 68. Clevis 68 is pivotally connected to one arm of lever 72 fulcrumed at 74 in bracket 76 depending from the upper wall of the tank 10 and on the interior thereof. The other end of lever 72 is connected to a slotted clevis 78 by means of a pivot pin 80, and clevis 78 is screw-threaded to the upper end of the connecting rod 82 by which it is connected to the valve member 32. The lower end of connecting rod 82 is formed as a ball 84 seated in a conical socket 86 on the interior of valve member 32 and secured therein by means of a threaded cap piece 88 so as to provide a ball and socket connection between the connecting rod 82 and valve member 32.

Pressure is applied through hydraulic line 60 to the upper end of cylinder 52 and the hydraulic piston 62 is pushed downwardly swinging lever 72 to lift valve member 32 against the compression of spring 40, thereby raising the valve member 32 from the seat 22 until the area of the free portion of apparatus 28 considerably exceeds the area of the discharge port formed by flange 24.

In order to provide for automatic closure of the valve in case of fire, and to insure this closure regardless of whether or not pressure is applied through the hydraulic line 60, fusible means are provided for relieving the pressure in the upper portion of the cylinder 52. As embodied, a duct 90 communicates with the upper portion of the hydraulic cylinder and is normally closed by a threaded fitting 92, the bore of which is sealed by a plug 94 of low-melting alloy such as solder or Wood's metal. Thus when a fire occurs, the fusible plug 94 readily melts and the pressure within the cylinder is thus relieved so as to allow spring 40 to force valve member 32 into closed position.

In order to facilitate assembly and disassembly of the valve member, and to permit removal of the valve assembly through the usual opening in the fill cover 48, pivot pin 80 and the slotted clevis 78 are formed as shown in Figure 4. The clevis pin 80 is formed of a flange 100 and a handle 102, while the other end of the pin is provided with a lateral extension 104. The clevis 78 is formed with an elongated slot 106 which is longer than the thickness of projection 104 added to the diameter of pin 80, while the width of the slot 106 is substantially equal to the diameter of pin 80. The opening near the end of lever 72 is formed as a cylindrical bore 108 of substantially the same size as pin 80 but having an uppermost enlargement sufficient to permit passage of the lateral projection 104. Lateral projection 104 and handle 102 are angularly related to each other so that the handle must be displaced from the position which it would normally assume under the influence of gravity in order to permit the passage of lateral projection 104 through the elongated slots 106 and aperture 108 so that after assembly the handle will fall and turn the projection 104 to lock position as shown in Figures 1 and 2. The upper end of yoke 42 is formed with a slot 110 to receive the connecting rod 82, while permitting the connecting rod to be moved laterally out of the slot after the clevis pin 80 has been removed. In this position compression spring 40 may be compressed by pushing on it with a stick through the fill cover 48, and when released the valve member 32 together with spring 40 may be lifted out of the tank through the fill cover 48. After inspection or repair the valve member 32 may be replaced in the guiding cylinder 26 and spring 40 pushed until it engages with the yoke 42 and is compressed beneath the yoke 42. The connecting rod 82 may then be swung into the slot 108 and reconnected to the lever 72. Thus, the valve member 32 and all its actuating parts may be removed from the tank without the necessity of removing the fill cover 48, as has heretofore been necessary with earlier tanks, and as the workmen need not get inside the tank, but can manipulate all of the parts by reaching into the tank, the tank need not be washed out or steamed, greatly reducing the time required for servicing the valve.

While only one compartment and valve have been shown, it will be understood that the other compartments of the tank may be provided with similar valves which are adapted to be controlled by their individual hydraulic line 60. The present invention is particularly useful in connection with gasoline tank truck valves, but is also useful in connection with tank valves for controlling the discharge of other liquids.

The invention in its broader aspects is not limited to the specific mechanisms shown and described but departures may be made therefrom within the scope of the accompanying claims without departing from the principles of the invention and without sacrificing its chief advantages.

What is claimed is:

1. A gasoline tank discharge valve including in combination an outlet in the bottom of a gasoline tank and having an apertured cylindrical guide surrounding a valve seat at the outlet port, a cylindrical valve member vertically slidable in said guide and adapted normally to rest against the seat to close the outlet, a slotted yoke supported by the bottom surface of the gasoline tank and extending immediately above the valve, a lift rod attached to the valve member guided by the slotted yoke and moveable sidewise into and out of the slot, a compression spring surrounding said lift rod and positioned between the yoke and valve member to seat the valve member in closed position, a lever pivoted to the upper internal portion of the gasoline tank and connected to the lift rod for actuation of the valve, and remote control fluid means for actuating the lever.

2. In a gasoline tank having a fill cover near the top of the tank, the combination of a discharge valve to control an outlet port near the bottom of the tank, a valve rod pivotally connected to said valve and extending upwardly therefrom, a yoke extending above the valve and being slotted to receive the valve rod, a spring surrounding the rod and reacting between the yoke and valve to normally close the valve, the slot and pivotal mounting of the rod being arranged to permit the removal of the valve from or replacement in the tank, a lever mounted within the tank and connected at one end to said valve rod in operable relationship therewith and pivoted intermediate its ends adjacent to the upper wall of the tank, and a fluid motor mounted to extend through the tank and connected to the lever to open the valve through movement of the lever and valve rod.

3. A valve structure as defined in claim 2 being provided with a removable pivotal connection between the lever and rod adjacent to and accessible from the fill cover, said removable pivotal connection allowing the lever and valve rod to be disconnected for removal as a unit by reaching through the fill cover.

ROBERT D. MARX.

References Cited in the file of this patent

UNITED STATES PATENTS

| Number | Name | Date |
|---|---|---|
| 981,087 | Hoyt | Jan. 10, 1911 |
| 1,206,485 | Tague | Nov. 28, 1916 |
| 1,466,116 | Campbell | Aug. 28, 1923 |
| 1,550,275 | Mullins | Aug. 18, 1925 |
| 1,568,057 | Carr | Jan. 5, 1926 |
| 1,625,323 | Lee | Apr. 19, 1927 |
| 1,723,567 | Lovekin | Aug. 6, 1929 |
| 1,771,716 | Lovekin | July 29, 1930 |
| 1,890,247 | Dieterich | Dec. 6, 1932 |
| 2,321,898 | Crista | June 15, 1943 |
| 2,430,956 | Scott | Nov. 18, 1947 |

FOREIGN PATENTS

| Number | Country | Date |
|---|---|---|
| 41,784 | Germany | of 1887 |